Jan. 6, 1925.  1,522,025
T. J. NOLAN ET AL
PRODUCTION OF TETRYL AND ETHYL TETRYL
Filed Dec. 24, 1923
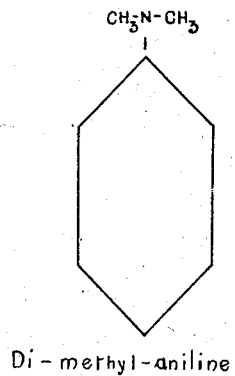
Di-methyl-aniline
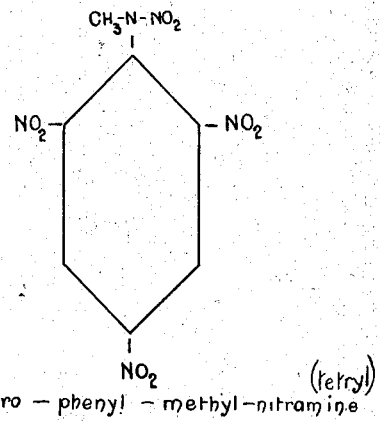
2:4:6 trinitro — phenyl — methyl-nitramine (tetryl)
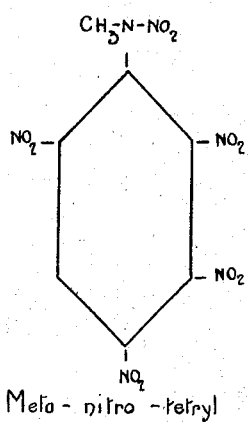
Meta-nitro-tetryl
Methyl - phenyl - nitrosamine
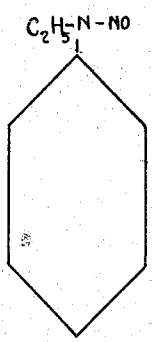
Ethyl - phenyl - nitrosamine
Inventors
T. J. Nolan
H. W. Clapham
By Marks & Clerk
Attys.

Patented Jan. 6, 1925.

1,522,025

UNITED STATES PATENT OFFICE.

THOMAS JOSEPH NOLAN AND HENRY WILLIAM CLAPHAM, OF STEVENSTON, SCOTLAND, ASSIGNORS, BY MESNE ASSIGNMENTS, TO E. I. DU PONT DE NEMOURS AND COMPANY, A CORPORATION OF DELAWARE.

PRODUCTION OF TETRYL AND ETHYL TETRYL.

Application filed December 24, 1923. Serial No. 682,543.

*To all whom it may concern:*

Be it known that we, THOMAS JOSEPH NOLAN and HENRY WILLIAM CLAPHAM, both subjects of the King of Great Britain and Ireland, and both residing at Ardeer Factory, Stevenston, Ayrshire, Scotland, have invented certain new and useful Improvements in and Relating to the Production of Tetryl and Ethyl Tetryl, of which the following is a specification.

This invention relates to the nitration of alkyl-phenyl-nitrosamines and particularly to the manufacture of tetryl, that is, 2:4:6-trinitro-phenyl-methyl-nitramine and its ethyl homologue or ethyl tetryl, namely, 2:4:6-trinitro-phenyl-ethyl-nitramine.

The diagram illustrates the graphical formulæ of several bodies referred to below.

In the manufacture of tetryl, as ordinarily carried out, dimethylaniline (see diagram) is treated with nitric acid in the presence of sulphuric acid, whereby nitration of the aromatic ring takes place and one of the methyl groups attached to the aminic nitrogen atom is replaced by the group $NO_2$ forming tetryl (see diagram).

In this reaction a considerable amount of nitric acid is used up in oxidizing the methyl group displaced from combination with the aminic nitrogen atom. Attempts have been made to use as a raw material for the manufacture of tetryl monomethylaniline and thus obviate the loss of nitric acid incurred from the above causes when dimethylaniline is used, but it has been found that the product so obtained is of most unsatisfactory quality. In large scale operations a large amount of resinous material is formed which impedes the action of the stirring gear of the vessels used in the manufacture and may give rise to fire; even under the best conditions the resulting tetryl is contaminated with a considerable proportion of a body m-nitro-tetryl (see diagram).

This material has an adverse effect on the stability of the product.

In the manufacture of the ethyl homologue, namely, ethyl tetryl, that is, 2:4:6-trinitro-phenyl-ethyl-nitramine, by the nitration of tehyl aniline we have found that similar difficulties occur, a substantial proportion of resinous material contaminating the product.

The object of the present invention is to provide processes for the manufacture of tetryl and its ethyl homologue free from such disadvantages of danger in manufacture and lack of stability in the finished product as are referred to above.

The invention consists in the nitration in the presence of sulphuric acid of an alkyl-phenyl-nitrosamine, particularly the conversion of monomethylaniline or monoethylaniline into the nitrosamine and more particularly followed by the nitration of the latter in the presence of sulphuric acid into tetryl or ethyl tetryl.

In carrying the invention into effect in one form by way of example in connection with the preparation of tetryl, methylaniline is converted in the ordinary way into methyl-phenyl-nitrosamine (see diagram) by treating a solution of methylaniline in hydrochloric acid with the requisite proportion of sodium nitrate solution. The crude nitrosamine, which separates out as an oil, is thoroughly washed with water. 30 parts of the nitrosamine so obtained are dissolved in 300 parts of sulphuric acid (98 per cent) maintained at 0° C., and the resulting solution then slowly added to 83.4 parts of nitric acid (92 per cent), the temperature of nitration being maintained between 50° and 55° C., agitation of the mixture being effected by mechanical stirring. Tetryl separates out. The temperature of the reaction mass is maintained at 55° C. for one hour by external heating. The mass is then allowed to cool to 15° C. and the tetryl separated from the waste acid and washed free from acid by repeated boiling with water.

The nitration of methyl-phenyl-nitrosamine to tetryl is characterized by the ease with which it can be controlled; the reaction proceeds much more smoothly than in the case of the nitration of dimethylaniline, the heat liberated being apparently much less than in the latter instance.

In the nitration as carried out in this way no appreciable amount of meta-nitro-tetryl is produced and the process is free of the mechanical difficulties referred to in using monomethylaniline.

In carrying out the invention in another way in which we utilize the monomethylaniline in mixtures of monomethylaniline and dimethylaniline, the so-called commercial monomethylaniline, for the production of tetryl we proceed, for example, as follows:—

The mixture of monomethyl- and di-methyl-aniline is dissolved in the requisite amount of acid and treated with sufficient sodium nitrate solution to react with the secondary base, that is, with the monomethylaniline present.

The nitrosamine which separates is collected and nitrated in the manner already indicated, while the dimethylaniline which remains in the acid solution is recovered in any known way, such as by making the solution alkaline and distilling in a current of steam.

In carrying out the invention in another way in which we utilize both the monomethylaniline and the dimethylaniline in mixtures of monomethylaniline and dimethylaniline, the so-called commercial monomethylaniline, for the production of tetryl we proceed, for example, as follows:—

100 parts of commercial monomethylaniline consisting of 70 per cent of monomethylaniline and 30 per cent of dimethylaniline are dissolved in 120 parts of 30 per cent hydrochloric acid and the mixture cooled to 0° C. The latter is then treated with a solution of sodium nitrite containing 46 parts of sodium nitrite, and the resulting nitrosamine, which collects as an oil, is mechanically separated from the aqueous solution.

The latter is then made alkaline with sodium carbonate and the tertiary base, which separates as an oil, is collected, mixed with the previously obtained nitrosamine and the mixture washed with water.

30 parts of the oil thus obtained are dissolved in 300 parts of sulphuric acid (98 per cent) maintained at 0° C. and the resulting solution then slowly added to 100 parts of nitric acid (92 per cent), the temperature being maintained between 50° and 55° C., throughout nitration, and the mixture mechanically stirred the whole time. Tetryl separates out. The temperature of the reaction mass is maintained at 55° C. for one hour by external heating. The mass is then allowed to cool to 15° C. and the tetryl separated from the waste acid and freed from acid by repeated boiling with water.

While we have described, to illustrate our invention, methods for the production of tetryl, the same methods are applicable in principle to the production of the ethyl homologue, trinitrophenyl-ethyl-nitramine from ethyl-phenyl-nitrosamine, ethylaniline per the nitrosamine or from the ethylaniline constituent in mixtures of ethylaniline and diethylaniline per the nitrosamine as the case may be. We exclude the use of mixtures of diethylaniline and ethyl-phenyl-nitrosamine for the production of ethyl tetryl. To illustrate the production of the ethyl homologue of tetryl from ethylaniline we proceed in one way as follows:—

Ethylaniline is converted in the ordinary way into ethyl-phenyl-nitrosamine (see diagram), by treating a solution of ethylaniline in hydrochloric acid with the requisite proportion of sodium nitrite solution. The crude nitrosamine, which separates out as an oil, is thoroughly washed with water. 30 parts of the nitrosamine so obtained are dissolved in 300 parts of sulphuric acid (98 per cent) maintained at 0° C. and the resulting solution then slowly added to 75.6 parts of nitric acid (92 per cent), the temperature of nitration being maintained between 50° and 55° C., agitation of the mixture being effected by mechanical stirring. Ethyl tetryl separates out. The temperature of the reaction mass is maintained at 55° C. for one hour by external heating. The mass is then allowed to cool to 15° C., and the ethyl tetryl separated from the waste acid and washed free from acid by repeated boiling with water.

Having now described our invention, what we claim as new and desire to secure by Letters Patent is:—

1. The process which consists in the nitration in the presence of sulphuric acid of an alkyl-phenyl-nitrosamine.

2. A process for the preparation of tetryl which consists in the nitration in the presence of sulphuric acid of methyl-phenyl-nitrosamine.

3. The process comprising the conversion of a mono-alkyl-aniline into the corresponding alkyl-phenyl-nitrosamine and nitration of the latter in the presence of sulphuric acid.

4. The process which consists in nitration of commercial monomethylaniline (that is, a mixture of monomethylaniline and dimethylaniline) in the presence of sulphuric acid, removal of the unacted on dimethylaniline and the nitration of the remaining nitrosamine in the presence of sulphuric acid.

5. A process for the preparation of tetryl comprising the conversion of commercial monomethylaniline, that is, a mixture of monomethylaniline and dimethylaniline, into the corresponding nitrosamine, the unacted on dimethylaniline being precipitated and added to the nitrosamine, the mixture of methyl-phenyl-nitrosamine and dimethylaniline thus obtained being nitrated with the requisite proportions of nitric and sulphuric acids.

In testimony whereof we have signed our names to this specification.

THOMAS JOSEPH NOLAN.
HENRY WILLIAM CLAPHAM.

Certificate of Correction.

It is hereby certified that in Letters Patent No. 1,522,025, granted January 6, 1925, upon the application of Thomas Joseph Nolan and Henry William Clapham, of Stevenston, Scotland, for an improvement in "The Production of Tetryl and Ethyl Tetryl," errors appear in the printed specification requiring correction as follows: Page 1, line 51, for the word "tehyl" read *ethyl;* same page, line 76, and page 2, line 7, for the word "nitrate" read *nitrite;* and that the said Letters Patent should be read with these corrections therein that the same may conform to the record of the case in the Patent Office.

Signed and sealed this 10th day of February, A. D. 1925.

[SEAL.]
KARL FENNING,
*Acting Commissioner of Patents.*